(12) United States Patent
Taffin et al.

(10) Patent No.: US 7,397,767 B2
(45) Date of Patent: Jul. 8, 2008

(54) METHOD OF ALLOCATING RESOURCES IN A RADIOCOMMUNICATION SYSTEM AND BASE STATION FOR IMPLEMENTING THE SAID METHOD

(75) Inventors: Arnauld Taffin, Bures-sur-Yvette (FR); Aurélie Gervais, Paris (FR); Bastien Massie, Paris (FR)

(73) Assignee: Alcatel Lucent, Paris (FR)

( * ) Notice: Subject to any disclaimer, the term of this patent is extended or adjusted under 35 U.S.C. 154(b) by 679 days.

(21) Appl. No.: 10/948,912

(22) Filed: Sep. 24, 2004

(65) Prior Publication Data

US 2005/0068973 A1 Mar. 31, 2005

(30) Foreign Application Priority Data

Sep. 25, 2003 (FR) ................................. 03 11248

(51) Int. Cl.
*H04L 12/26* (2006.01)
(52) U.S. Cl. .................... 370/252; 370/412; 370/468
(58) Field of Classification Search ................ None
See application file for complete search history.

(56) References Cited

U.S. PATENT DOCUMENTS

| | | | | |
|---|---|---|---|---|
| 6,891,856 B2 * | 5/2005 | Umayabashi | ............... | 370/468 |
| 2002/0176358 A1 * | 11/2002 | Assa et al. | .................. | 370/229 |
| 2003/0076848 A1 * | 4/2003 | Bremler-Barr et al. | ...... | 370/412 |
| 2003/0096597 A1 | 5/2003 | Kar-Kin Au et al. | | |
| 2003/0133457 A1 * | 7/2003 | Ono et al. | ................ | 370/395.4 |

FOREIGN PATENT DOCUMENTS

| EP | 1 130 877 | 9/2001 |
|---|---|---|
| EP | 1 227 626 | 7/2002 |

OTHER PUBLICATIONS

TS 25.308, Release 5, version 5.4.0, "Universal Mobile Telecommunications Systems (UMTS); Utra High Speed Downlink Packet Access (HSDPA): Overall description; Stage 2," published in Mar. 2003 by the 3GPP, 31 pgs.
TS 25.321, Release 5, version 5.5.0, "Universal Mobile Telecommunications Systems (UMTS); Medium Access Control (MAC) protocol specification," published in Jun. 2003 by the 3GPP, 56 pgs.

* cited by examiner

*Primary Examiner*—Chau T. Nguyen
*Assistant Examiner*—Dargaye H Churnet
(74) *Attorney, Agent, or Firm*—Sughrue Mion, PLLC

(57) ABSTRACT

For a new transmission time interval, respective weights are assigned to queues. The queues are ranked as a function of the weights assigned to them. The first queue according to the ranking is selected. A quantity dependent on the radio conditions in respect of the radio terminal to which the said radio session relates, and on a number of packets already transmitted within the context of the said session is calculated for each session within the context of which it is required to transmit data packets placed in the selected queue. Communication resources are allocated to some of the sessions so as to transmit a number of data packets placed in the selected queue, depending on the weight assigned to the selected queue, the said sessions being determined as a function at least of the said quantities calculated. Once the selected queue has been served, and if there are still resources available for the transmission time interval, we pass to the next queue in the ranking so as to serve it.

25 Claims, 3 Drawing Sheets

METHOD OF ALLOCATING RESOURCES IN A RADIOCOMMUNICATION SYSTEM AND BASE STATION FOR IMPLEMENTING THE SAID METHOD

BACKGROUND OF THE INVENTION

The present invention relates to the allocation of resources in a communication system. It relates more particularly to the allocation of resources among a set of resources shared in a radiocommunication system.

Numerous methods of allocating resources are known. Among them may be mentioned, by way of example, the "round robin" method in which the resources are allocated to serve various users in turn.

A method of allocation such as "round robin" may make it possible to distribute the resources equitably between the various users, by assigning them one and the same priority level. Thus, the same quantity of data will be transmitted to each user over a transmission time period.

Such a method, well suited to wire networks, cannot however be applied satisfactorily in a radiocommunication network. In such a network, in fact, the propagation channels vary continuously, as a function of the radio conditions, so much so that it is very difficult to ensure a constant throughput for a user, and a fortiori, equity in the quantity of data transmitted to the various users over a transmission time period.

Specifically, if the radio link of a given user is very degraded, the data transmitted over this link will not be able to be decoded correctly when they are received by this user. Equity will then no longer be complied with. Furthermore, communication resources will have been used needlessly, whereas they could have been exploited to transmit data destined for a user furnished with a radio link of better quality.

Other methods of allocating resources are also known and are used in radiocommunication networks. These methods take account of the quality of the radio links, basing themselves for example on a signal-to-interference (C/I) ratio.

FIG. 1 illustrates an exemplary allocation according to such a method. The upper part of the figure depicts data packets D1-D4 to be transmitted to four respective users U1-U4. Thus, the data D1 will be required to be transmitted to the first user U1, the data D2 to the second user U2, D3 to U3 and D4 to U4.

The same priority level is assigned to each user. On the other hand, the users have radio links of different quality. To simplify the example, it is considered that the quality of a radio link is represented by a parameter indicating the number of data packets that can be received by the corresponding user during a transmission time interval. In this example, it is considered that this parameter has a value Q1=5 for the user U1, this signifying that U1 will be able to receive five data packets D1 at most, at each transmission time interval. Likewise, the parameters Q2-Q4 corresponding respectively to the quality of the radio links associated with the users U2-U4, have the following values: Q2=2, Q3=6 and Q4=3.

The lower part of FIG. 1 represents the data transmitted, as a function of the resources allocated, for each transmission time interval. The number of data packets that can be transmitted at each interval has been fixed at 8 in this example. U3 has the radio link of better quality, 6 communication resources will therefore be allocated to the said user by priority, during the first transmission time interval $t_1$, so that 6 data packets D3 can be transmitted to this user, that is to say the maximum number of packets for the latter, by virtue of the quality on the corresponding link (Q3=6). The 2 remaining resources for this interval $t_1$ will be allocated to U1 who has the second best quality link (Q1=5). During the subsequent transmission time intervals $t_2$, $t_3$ . . . , the same allocation of resources will be made, as illustrated in FIG. 1, as long as the parameters Q1-Q4 remain unchanged and as long as there are still data to be transmitted to the users U1 and U3.

It is therefore noted, in this example, that only the users U1 and U3, who benefit from a radio link of good quality, can receive data over a certain time period. Furthermore, although the quality of the links associated with the users U1 and U3 differs little (Q1=5 and Q3=6), U3 receives three times as much data as U1 over the same time period.

Such a method of allocating resources, which favours the users furnished with a radio link of good quality, is not satisfactory either, since it is greatly prejudicial to certain users, who would yet be able to receive a substantial quantity of data, in favour of a restricted number of other users.

Furthermore, other constraints are sometimes neglected in certain known methods of allocating resources. This includes for example the number of resources actually available at the radio transmitter level, the type of data transmitted (identical processing of the first transmissions and of the retransmissions may be damaging in certain cases), or else the reception capabilities of the user terminals (certain terminals may not receive data at each transmission time interval for example).

An object of the present invention is to limit the abovementioned drawbacks, by allocating the resources according to an effective compromise between a certain level of equity between the users and the taking into account of the radio conditions existing on the corresponding radio links.

Another object of the invention is to propose an allocation of the resources that is well suited to radiocommunication systems comprising a set of resources to be shared between various users.

Yet another object of the invention is to improve the effectiveness of the allocation of resources, by taking account of other constraints neglected in the currently known methods of allocation.

SUMMARY OF THE INVENTION

The invention thus proposes a method of allocating resources in a radiocommunication system comprising at least one base station devised to transmit, in successive transmission time intervals, data packets destined for radio terminals, on communication resources shared between the radio terminals, within the context of transmission sessions, each session relating to a radio terminal among the said radio terminals, in which there is provided a set of queues that are devised so that the data packets to be transmitted within the context of each transmission session are placed dynamically in one of the queues, the method comprising the following steps:

/a/ a respective weight is assigned to each queue;
/b/ the queues are ranked as a function at least of the weights respectively assigned to them;
/c/ The first queue is selected according to the ranking of step /b/;
/d/ a quantity dependent at least on the radio conditions in respect of the radio terminal to which the said radio session relates, and on a number of packets already transmitted within the context of the said session is calculated, for a new transmission time interval, for each session within the context of which it is required to transmit data packets placed in the selected queue;
/e/ communication resources are allocated to some at least of the sessions within the context of which it is required to transmit data packets placed in the selected queue, so as to transmit a number of data packets placed in the selected queue, the said number of data packets depending on the weight assigned to the selected queue, the said sessions to which communication resources are allocated being determined as a function at least of the quantities calculated in step /d/; and /f/ as long as the queues have not all been selected and as long as there are still resources available for the said transmission time interval, the queue following the queue previously selected in the ranking established in step /b/ is selected, and steps /d/ to /f/ are repeated.

This allocation in two stages (one for the selection of a queue and the other for the selection of the data packets to be transmitted inside a selected queue) of the shared resources makes it possible to take account of the radio conditions existing on the corresponding radio links, while ensuring a certain level of equity.

Furthermore, it makes it possible to take account of other constraints sometimes neglected in certain conventional resource allocators, such as a minimum time to be complied with in respect of a terminal between two receptions of data packets transmitted over respective transmission time intervals, a number of codes that are applied to the data and can be decoded over a transmission time interval, or a type of modulation that is applied to the data that can be demodulated. The retransmissions may form the subject of a processing differentiated from the first transmissions in the allocation of the resources.

The invention furthermore proposes a base station devised to implement the above method.

Figure 1:
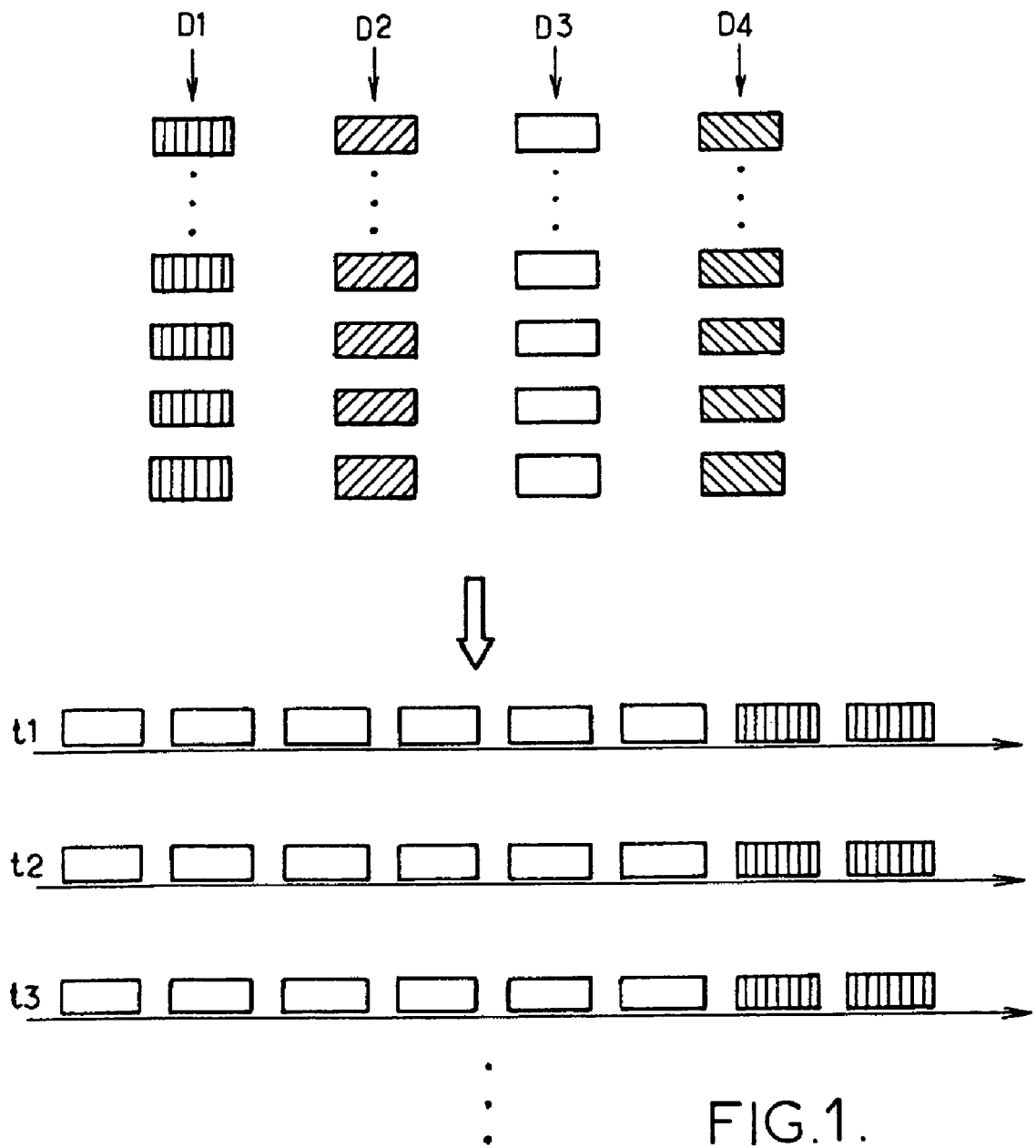
FIG. 1, already commented on, is a diagram representing a mode of allocating resources according to a conventional allocation method.

DESCRIPTION OF PREFERRED
EMBODIMENTS

The present invention finds an application in particular in radiocommunication systems comprising a set of resources to be shared between various users. It will be described hereinbelow within the context of the HSDPA ("High Speed Downlink Packet Access") functionality, available in the UMTS ("Universal Mobile Telecommunication System") radiocommunication system, without thereby restricting the generality of its subject matter. An overall description of the HSDPA functionality can be found in the technical specification TS 25.308, Release 5, version 5.4.0, published in March 2003 by the 3GPP.

HSDPA allows the transmission, by a base station, of data at high throughput in respect of a set of radio terminals situated in the zone of coverage of the base station. It relies on a time-sharing and code-sharing high-throughput downlink transport channel: the HS-DSCH ("High Speed-Downlink Shared Channel"). In the FDD ("Frequency Division Duplex") mode, the characteristics of this channel are in particular: (i) a transmission time interval (TTI) of 2 milliseconds corresponding to 3 time slots of 666 μs; (ii) hybrid data retransmission request processes of HARQ type ("Hybrid Automatic Repeat reQuest"); and (iii) an adaptive coding and modulation mechanism.

At the access network level, a specific sublayer of the medium access control protocol, MAC-hs ("Medium Access Control-high speed"), is localized in the base station. This layer receives data originating from the so-called MAC-d sublayer localized, for its part, in the radio network controller RNC on which the base station depends. Thus, matters are arranged such as to offer an optimum throughput on the HS-DSCH channel. For the same reason, the HS-PDSCH uses a relatively low spreading factor, equal to 16. In a given cell and for a given scrambling code, up to 15 HS-PDSCH channels may be established using orthogonal "channelization" codes. Details regarding medium access control may be found in the technical specification TS 25.321, Release 5, version 5.5.0, published in June 2003 by the 3GPP.

For an HS-DSCH channel, it is necessary to provide one or more specific shared physical control channels called HS-SCCH ("High Speed-Shared Control CHannel"). The signalling information carried by the HS-SCCHs identify the destination terminals of the blocks transmitted on the HS-PDSCHs, and provide them with a certain number of indications useful for the reception of these blocks:

a transport format and resource indicator (TFRI), giving the information concerning the format of the dynamic part of the HS-DSCH channel, in particular for the modulation scheme employed, and the physical resources allocated ("channelization" codes);

the information related to the HARQ protocol, in particular the redundancy version, an HARQ process identifier, and an indicator of new data blocks.

Feedback information is moreover returned by the terminal, in particular for the acknowledgements of the HARQ protocol, for the measurements useful for link adaptation. This information is transmitted by a dedicated uplink resource, on a channel dubbed HS-DPCCH ("High Speed-Dedicated Physical Control Channel"). By way of illustration, the link adaptation makes it possible to modify the shaping format of the data to be transmitted as a function of the quality of the radio link. For this purpose, a shaping request based on an estimate of the signal-to-interference ratio of the downlink, called CQI ("Channel Quality Indicator"), is periodically returned to the base station by the terminal. The parameter CQI is coded on 30 levels, the gap between two levels corresponding to a gap of 1 dB in the signal-to-interference ratio. With each value of CQI is associated a data shaping format, comprising a modulation scheme, a number of codes that can be received simultaneously by the terminal in a TTI, the size of the information block. The object of the link adaptation mechanism is then to choose, as a function of the values of CQI uploaded, a format for transmission on the HS-DSCH channel, so as to ensure, with a certain level of probability, decoding of the data by the terminal (an error rate of 10% in decoding is typically aimed at).

Moreover, each terminal can provide the base station under whose radio coverage it finds itself, by way of the RNC, with information concerning its reception capabilities. It thus indicates to the base station in particular:

whether it supports the two modulations provided for in the system; namely QPSK ("Quadrature Phase Shift Keying") modulation and 16-QAM ("16-Quadrature Amplitude Modulation") modulation, or else just one of them;

if its memory allows it to receive data at every TTI, or else every n TTI only, with n an integer;

if its memory allows it to implement all the possible modes of the HARQ protocol (repetition mode, total or partial incremental redundancy mode), or else only some of them.

On setting up the HS-DSCH and HS-SCCHs, the radio network controller which supervises the base station (CRNC, "Controlling RNC") allocates it the corresponding code resources, per cell. By way of example, provision may be made to reserve a list of L=16 codes with spreading factor 128 for the HS-SCCH channels.

At each TTI, these resources are distributed among various users for which data are to be transmitted. To do this, an allocation of resources will be performed by the MAC-hs sublayer of the base station considered.

Several HSDPA sessions involving one and the same radio terminal can be active simultaneously. In this case, the allocation of resources will be performed on the basis of the sessions rather than of the radio terminals. In what follows, it is considered, to simplify the account, without thereby restricting the scope, that a single transmission session can take place simultaneously for each radio terminal, so that the allocation will be considered to be an allocation of resources to the radio terminals themselves.

According to the invention, the allocation of resources is carried out on completion of two series of operations: a first stage of the allocator distributes the data packets to be transmitted in queues weighted according to priority levels, and also selects a queue from among the set of queues, and a second stage of the allocator determines, inside the selected queue, the users to be served by priority, as well as the number of data packets to be transmitted to these users.

The first stage of the allocator is considered first of all. The latter performs operations at the level of the data packets or MAC-d PDU (subsequently denoted PDU ("Packet Data Units")), and not at the level of the binary elements or bytes as do numerous conventional allocators. In what follows, the assumption is made that the PDUs have a single size. For the requirements of the first stage of the allocator, the data packets having different sizes are then considered as being as many PDUs with this single size.

The first stage of the allocator relies on a certain number of independent queues, typically 16 queues. It assigns corresponding weights to each of the queues, which weights it can adjust at any moment, for example as a function of their occupancy. The weights correspond substantially to a number of PDUs to be transmitted. Thus, the higher the weight of a queue, the larger the number of data packets that it will be able to transmit over one or more transmission time intervals. The sum of the weights assigned to the various queues may be constant.

By way of example, if this aggregate total is 272, respective weights can be assigned to the queues according to the arithmetic sequence: 2, 4, 6, 8, . . . , 28, 30, 32. However, the allocator can distribute the weights differently. In particular, if certain queues are empty, that is to say they have no PDU that could be transmitted during a forthcoming transmission time interval, they will advantageously be assigned a zero weight, so as to favour the active queues containing PDUs to be transmitted: the weights are then assigned in such a way that the aggregate total of 272 is distributed among the active queues.

The first stage of the allocator dynamically places the various PDUs to be transmitted in the queues. This distribution can be carried out according to various criteria. Advantageously, it may be performed by taking account of a level of service or of priority, for example provided for by a radio terminal user's subscription, or associated with the user's active session. The network is in fact furnished with information concerning a level of priority ("CmCH-PI" parameter in the UMTS standard), that may be related to the subscription taken out by the user of the radio terminal, which it transmits to the base station. A user who has taken out a high-level subscription will benefit from a high priority level. The allocator will then advantageously be able to place the PDUs destined for the terminal of such a user, in the queue having the greatest weight. In this way, the user in question will be able to send his traffic in priority fashion during the next transmission time interval, and thus benefit from a generally high throughput. Conversely, a subscriber who has taken out a minimum subscription will have his PDUs steered by preference towards queues of lesser weights. Thus, each queue will receive the PDUs destined for one or more users benefiting from a corresponding priority level.

Advantageously, the assignment of the weights to the queues is such that the weights assigned are of relatively low value, so as to avoid the situation where a queue having a much higher weight than the others, alone monopolizes the available radio resources, so as to serve only a restricted number of terminals to the detriment of the others.

It was seen above that the number of PDUs to be transmitted for each queue was fixed by the allocator and that it served in particular to weight the corresponding queue. According to an advantageous embodiment of the invention, this number can in fact vary between bounds so as to permit the transmission of a slightly higher or lower number than this theoretical number, so as to take account of the quality of the radio links between the Node B and the radio terminals for which the PDUs are destined. This mechanism makes it possible for example to transmit a number of packets that complies with what a radio terminal is capable of receiving by virtue of the radio conditions from which it benefits, while the corresponding queue possesses a weight that is slightly lower than this number of packets. Such a point-like increase or limitation in the number of PDUs transmitted for a queue is then taken into account in reverse, so as to approach the theoretical number of PDUs to be transmitted during the allocation of resources for the following transmission time interval.

This mechanism for adapting the number of packets to be transmitted around the predetermined weight can advantageously be conducted in the following manner. Let N be the theoretical number of packets to be transmitted for a given queue, which corresponds to the weight assigned to this queue. We define an upper bound Bs and a lower bound Bi around N. A sliding window of width 2M, with M an integer less than or equal to N/2, is moreover defined, centred or otherwise, around N. This sliding window comprises the possible values of the number of PDUs that can be transmitted for the queue considered during one or more transmission time intervals. The window slides as a function of the number of PDUs actually transmitted at each transmission time interval. Thus, if a number N+n of PDUs is transmitted at a given instant, the sliding window will be shifted to take smaller values of n during the following transmission time interval for the queue considered. Account will thus be taken of the deficits or advances consented to in the transmission of the data packets for a queue. The shift of the sliding window is however limited: its lower value cannot go below N−2M and its upper value cannot exceed N+2M. The adaptation of the number of packets to be transmitted is thus limited around the predetermined theoretical value.

Figure 2:
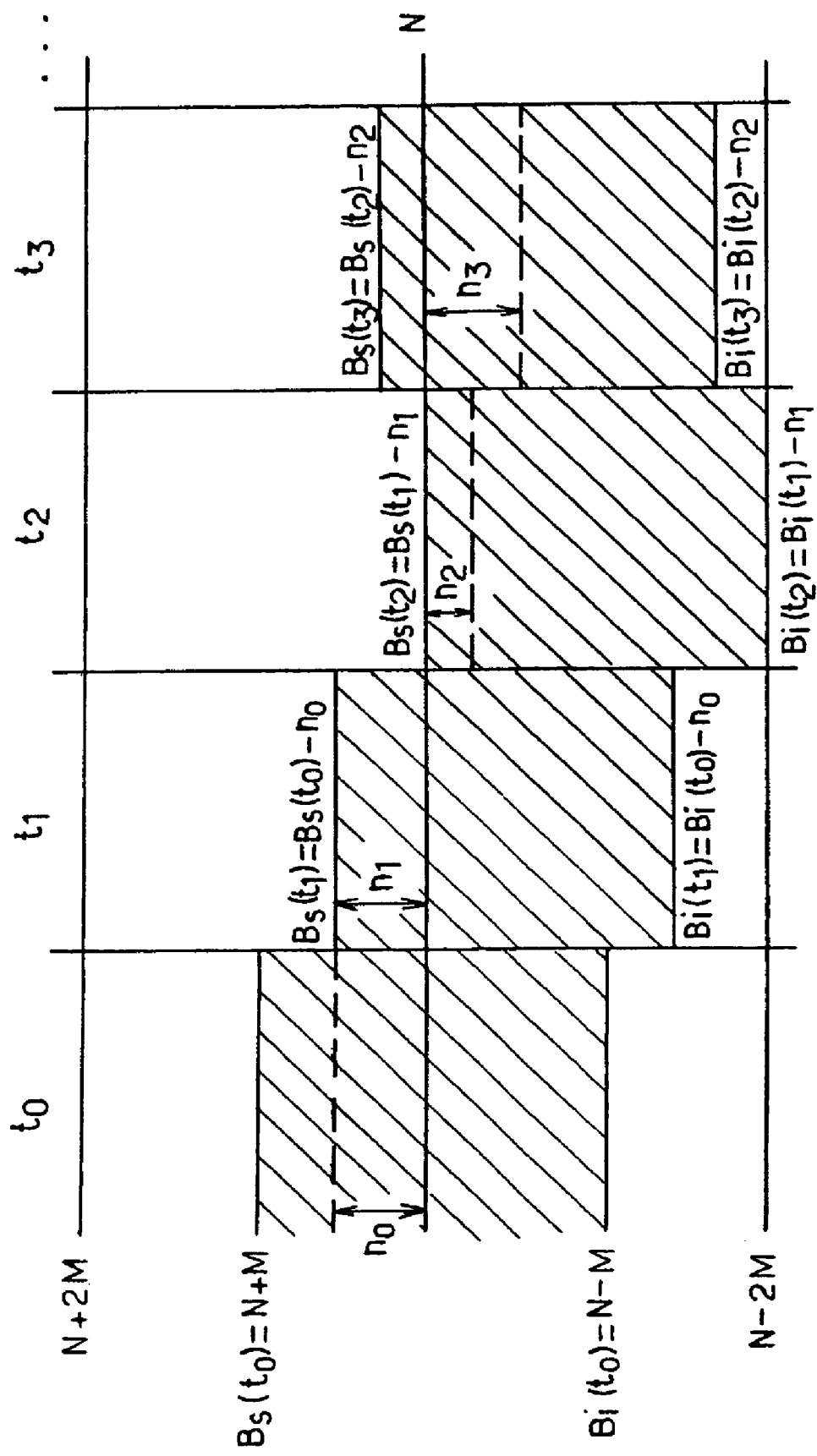
FIG. 2 is a diagram illustrating an adaptive mechanism implemented in a first stage of the resource allocator according to the invention.

FIG. 2 illustrates this principle for a given queue. The bounds Bs and Bi are initially fixed at the values N+M and N−M respectively in this example. The sliding window is therefore nicely contained in the span lying between the extreme values N+2M and N−2M. During the first transmission time interval represented, $t_0$, the number of PDUs actually transmitted for this queue is N+$n_0$, this corresponding to an advance of $n_0$ with respect to the theoretical number N. During the following transmission time interval for this queue, $t_1$, the sliding window is then shifted downwards to take account of the advance $n_0$, this being represented, in FIG. 2, by the expressions Bs($t_1$)=Bs($t_0$)−$n_0$ and Bi($t_1$)=Bi($t_0$)−$n_0$. We thus have Bs($t_1$)=N+M−$n_0$ and Bi($t_1$)=N−M−$n_0$. During the following transmission time interval, $t_2$, the sliding window is shifted downwards by a value of $n_1$, so that its lower bound Bi coincides with the minimum value N−2M. A new advance in the number of PDUs transmitted in the interval $t_2$ is therefore excluded. In the example illustrated, a deficit of $n_2$ appears in the transmission (i.e. an "advance" of −$n_2$ if $n_2$ is positive). During the following interval $t_3$, the sliding window is then shifted upwards to compensate for this deficit. This mechanism is continued in the same fashion subsequently. It is also applied to all the other active queues.

Moreover, the first stage of the allocator performs, in addition to the dynamic distribution of the PDUs into the queues, a selection of a given queue from among the various queues. The indication of the queue selected is provided to the second stage of the allocator, so that the latter sets up a ranking of the PDUs of this selected queue, with a view to their transmission.

The selection of a queue by the first stage of the allocator can be performed according to various criteria. It is for example possible to select the queue having the highest weight at the moment of selection. According to another advantageous embodiment of the invention, a queue is selected as a function on the one hand of the weight assigned to each queue, and on the other hand of a number of PDUs previously transmitted from each queue. The selection of a queue that has transmitted few PDUs during its previous transmission period, but to which a large weight has been assigned, is therefore preferably favoured. By way of example, it is possible to select the queue for which the $N_{PDU}$/weight ratio is the lowest, where $N_{PDU}$ designates the number of PDUs transmitted from the queue considered during its last selection.

Advantageously, a ranking of the queues is performed by the first stage of the allocator on the basis of one of the abovementioned criteria (for example according to an ascending order of the $N_{PDU}$/weight ratio calculated for each queue), the selection of a queue then being limited to the choice of the queue according to the ranking established. Thus, the queue at the head of the ranking is firstly selected, that is to say for example the one which possesses the smallest $N_{PDU}$/weight ratio. Then, when the allocation of resources has been completed for the radio terminals which were destined for PDUs that were placed in the first queue of the ranking (or the sessions relating to these terminals), the second queue of the ranking will then be selected, that is to say for example the queue with the second smallest $N_{PDU}$/weight ratio, and so on and so forth, until all the active queues have been selected or until all the available resources for this. TTI have been used.

The second stage of the resource allocator is now considered. The aim of this stage is to define, from the queue selected by the first stage of the allocator, which of the users among those having PDUs ranked in the selected queue, will be able to have resources for sending traffic, during the following transmission time interval. Its aim is also to define the number of PDUs that these users will be able to receive during the next transmission time interval. It is in this second stage that the radio conditions are taken into account for each user. Other parameters related to the terminals of the users are also taken into account in this stage.

In the second stage of the allocator, a cost function is associated with each radio terminal (or with each transmission session) that could receive PDUs. The radio terminal, in a given queue, for which the calculated cost is the smallest, will be selected by a priority to receive the PDUs destined for it in the said queue.

The cost function is chosen so as to favour the users who benefit from good radio conditions, in such a way as to offer them a high throughput. However, it also complies with a certain level of equity between the various users, in such a way as to avoid a situation where only the users benefiting from good radio conditions would be able to receive data, to the detriment of the others. The cost function therefore achieves a compromise between these two constraints.

We now take the standpoint of a given queue, previously selected by the first stage of the allocator, and in which PDUs destined for terminals have been placed. The updating of the costs for each of these terminals preferably occurs on completion of the distributing of the PDUs performed by the first stage of the allocator.

The cost function takes several parameters into account. A first parameter relates to the radio conditions. Advantageously, this parameter may be the CQI uploaded to the base station by each terminal, as mentioned above. However, other parameters relating to the radio conditions may also be used, such as for example commands to increase or decrease the transmission power, estimates of the speed of the terminals, etc.

The cost function may furthermore take account of a parameter making it possible to ensure a certain level of equity between the users, in terms of throughput sent. For this purpose, it takes account of the number of PDUs transmitted during the previous transmission time interval.

An exponential averaging may advantageously be applied to this cost function. This makes it possible to take account of the aforesaid parameters over a significant and pertinent time period. The cost function can then be expressed in the form:

$$\text{cost}_i = \rho * \text{cost}_{i-1} + (1-\rho) * f(N_{pdu\_transmitted}, CQI) \quad (1)$$

where $\text{cost}_i$ represents the cost calculated for transmission time interval i, f is a function making it possible to ensure the compromise between equity, based on the number $N_{pdu\_transmitted}$ of PDUs transmitted during the previous transmission time interval, and the quality of the radio link, based in this example on the parameter CQI. In Equation (1), $\rho$ is a real such that $0 \leq \rho \leq 1$, making it possible to take more or less account of the observations obtained in the past. Thus, if $\rho$ is close to zero, the old values are of little importance in the new cost estimate. Matters are entirely otherwise as $\rho$ approaches 1.

In an embodiment of the invention, one seeks to transmit to each radio terminal a number of PDUs as a function of the radio conditions measured for this terminal. This number is denoted $N_{pdu\_opt}(CQI)$. For a radio terminal, the better the radio conditions from which this terminal benefits, the higher therefore the number of PDUs transmitted. It is for example possible to choose to routinely transmit the maximum number of PDUs that the terminal considered is capable of correctly receiving, in the limit, of course, of the weights associated with the corresponding queue and of the available resources.

The cost function resulting from this assumption may then be written according to the following equation, with the notation introduced above:

$$\text{cost}_i = \rho * \text{cost}_{i-1} + (1-\rho) * N_{pdu\_transmitted}/N_{pdu\_opt}(CQI) \quad (2)$$

Such a cost function does indeed achieve a compromise between optimization of the radio throughput and a certain level of equity between the users.

Illustrated hereinbelow is the manner of operation of the second stage of the allocator in an example. It is assumed, in this example, that PDUs destined for the terminals of three different users are ranked in the queue considered. Among these three users, the first U1 possesses a good CQI and can receive up to 8 PDUs per transmission time interval (TTI), the second U2 has a smaller CQI than in U1 and can receive up to 5 PDUs per TTI, and the third U3 possesses the worst CQI of the three users and can receive only 3 PDUs at most per TTI.

It is moreover considered that 10 PDUs can be transmitted per TTI. Furthermore, the cost function used by the second stage of the allocator is that of Equation (2), in which $\rho$ has been fixed at the value 0.9. Finally, a cost value of 0.625 at the instant i−1, for each of the users U1 to U3, is taken as starting assumption.

Figure 3:
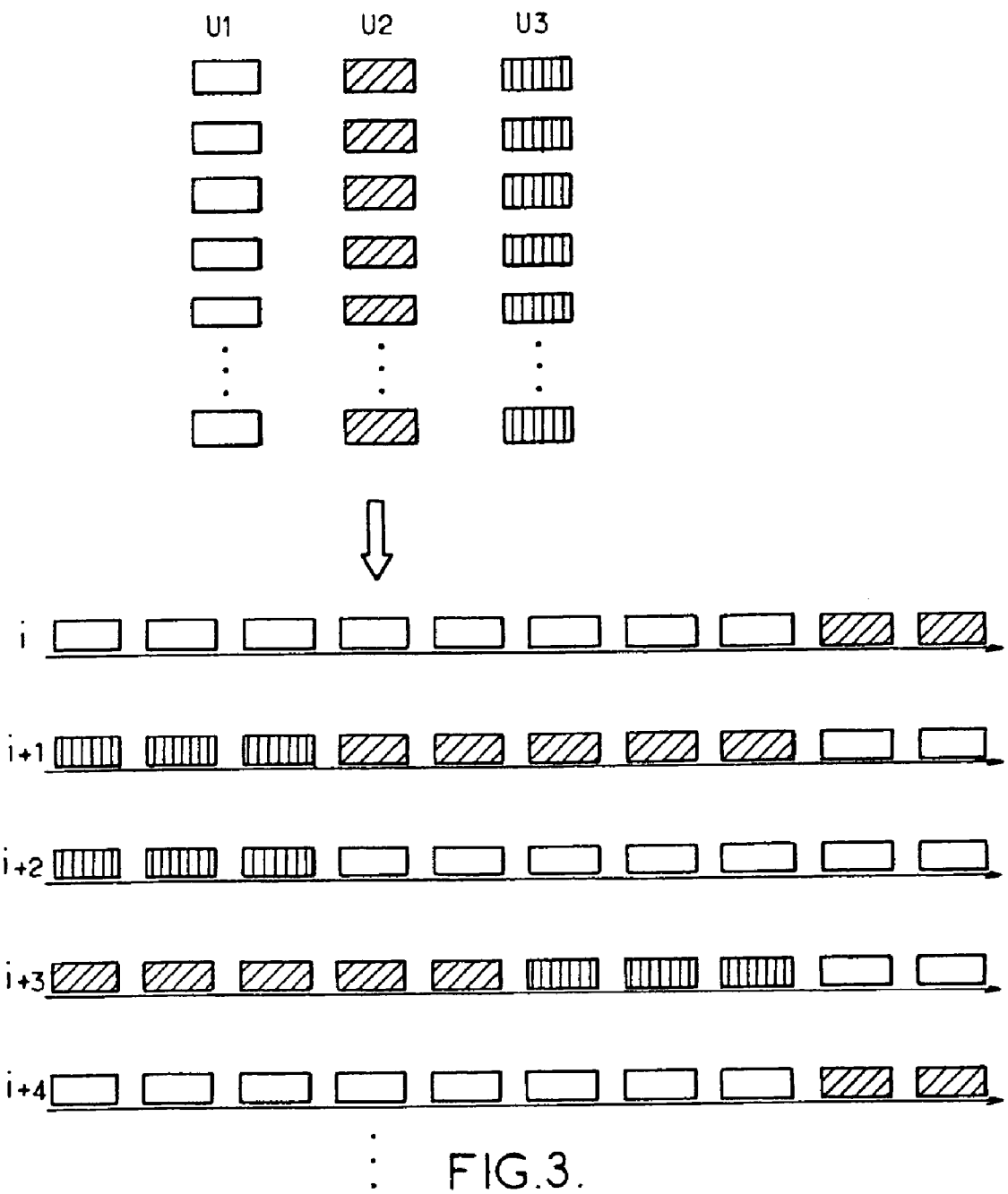
FIG. 3 is a diagram representing certain operations performed by a second stage of the resource allocator according to the invention.

FIG. 3 illustrates this example. For the i-th round, the user having the smallest cost value, determined according to Equation (2), is chosen. The three values being identical in this case, the user exhibiting the best CQI, that is to say U1 in this example, is then chosen to receive by priority the PDUs destined for him. The allocation of resources will therefore be such that the maximum number of PDUs that can be received by U1, that is to say 8 PDUs, are transmitted to him at the instant i. Since a total of 10 PDUs can be transmitted at the instant i for the queue considered, the 2 (=10−8) remaining resources will be allocated to the PDUs destined for U2 who has the second priority, since the costs are the same for U2 and U3 and since U2 has a better CQI than U3. To summarize, for the i-th round, the allocation is therefore such that it reserves resources firstly to 8 PDUs destined for U1, then for 2 PDUs destined for U2.

The cost values are then updated for the next round i+1, according to expression (2). One thus obtains the following costs: 0.662 for U1, 0.602 for U2 and 0.562 for U3. It is therefore U3 who possesses the smallest cost, and who will in this regard be served first during the next transmission. Three resources will therefore be allocated by priority to the transmission of 3 PDUs destined for U3, this corresponding to the maximum number of PDUs that U3 can receive. For the allocation of the 7 (=10−3) remaining resources, the second user to be served by priority is determined: U2 is the one who has the second smallest updated cost. Resources will therefore be allocated so that U2 can receive the 5 PDUs that he is capable of receiving. The 2 (=7−5) remaining resources will be allocated to the PDUs destined for U1, as illustrated in FIG. 3.

The costs are then again updated for the following round. The allocation is then continued in the same manner for each transmission time interval.

In the example set forth hereinabove, it can be shown that after five rounds of resource allocation, the number of PDUs transmitted is 27 for U1, 14 for U2 and 9 for U3. Thus, the users are well served as a function of the radio conditions from which they benefit: the throughput offered to U1, who has the best CQI, is in fact greater than that of the other users. Furthermore, a certain level of equity has been complied with since no user has been prejudiced against to the point of not receiving any PDUs at all: after five rounds of allocation, U3 has benefitted from 18% of the transmissions, despite his unfavourable radio conditions.

As indicated above, other constraints on the allocation of resources may appear. These constraints are advantageously taken into account in the second stage of the allocator. Among these constraints mention may be made of a minimum time interval necessary between two data transmissions destined for a terminal, according to the reception and processing capabilities of the said terminal. This information is transmitted to the Node B responsible for the HSDPA communication, as described above. The second stage of the allocator then takes it into account in such a way as to comply with a minimum number of TTIs between two allocations of resources so as to send traffic to the terminal considered.

In the same manner, parameters such as the type of modulation supported by a terminal, or the number of codes that it is capable of decoding over a transmission time interval, are provided to the Node B, by way of the RNC, and are taken into account in the resource allocation mechanism. The second stage of the allocator is advantageously responsible for taking this into account.

Yet many other parameters may moreover be taken into account by the second stage of the resource allocator according to the present invention, such as for example the fact that the PDUs present in a queue have already been transmitted previously or otherwise. A particular process may in fact be accorded to the retransmissions, for example to afford them priority with respect to the transmissions of PDUs performed for the first time. For this purpose, the allocator will be based on the reception of positive or negative acknowledgement messages received from the terminals, as described above.

The allocation of resources on the HS-DSCH channel, according to the allocator proposed by the present invention, is therefore based on the prior operations performed by the first and second stages of the allocator. It consists in making successive use of the whole set of resources available at the Node B level to send respective PDUs to be transmitted in the following order: for a queue selected by the first stage of the allocator according to a selection mechanism such as described above, the terminals to which PDUs will be transmitted are determined, as is the number of PDUs to be transmitted to each of these terminals, in the ascending order of costs previously obtained, for each terminal, by the second stage of the allocator. This allocation is performed for each transmission time interval in succession.

When the queue selected by the first stage no longer contains any PDUs to be transmitted or has reached the maximum number of PDUs that it can transmit (corresponding substantially to its weight), the first stage selects a new queue from among the set of queues with the exclusion of the queue previously selected, next, resources are then allocated for the PDUs ranked in this new queue selected according to an order determined by the second stage of the allocator.

Once all the active queues have been selected in succession by the first stage of the allocator and all the PDUs that they contain have been transmitted on completion of an allocation of resources taking account moreover of an order determined by the second stage of the allocator, the first stage of the allocator then resumes its process of selecting a queue from among the whole set of queues, taking account for example of the weights updated for each of the queues and possibly of the number of PDUs transmitted from each queue during a previous transmission, as was described previously. In a preferred variant, a ranking with the first stage of the allocator is redone without waiting until all the queues have been selected. The first stage of the allocator resumes its process of ranking and selecting a queue at each new transmission time interval.

The invention claimed is:

1. Method of allocating resources in a radiocommunication system comprising at least one base station devised to transmit, in successive transmission time intervals, data packets destined for radio terminals, on communication resources shared between the radio terminals, within the context of transmission sessions, each transmission session relating to a radio terminal among the said radio terminals, in which there is provided a set of queues that are devised so that the data packets to be transmitted within the context of each transmission session are placed dynamically in one of the queues, the method comprising:
   (a) assigning a respective weight to each queue;
   (b) ranking the queues as a function of at least the weights respectively assigned to them;
   (c) selecting a queue as a function of its position in the ranking of step (b);
   (d) for a new transmission time interval, calculating for each transmission session within the context of which it is required to transmit data packets placed in the selected queue a quantity dependent at least on the radio conditions with respect to the radio terminal to which said transmission session relates, and on a number of packets already transmitted within the context of said transmission session;
   (e) allocating communication resources to at least some of the transmission sessions within the context of which said transmission sessions are required to transmit data packets placed in the selected queue, so as to transmit a number of data packets placed in the selected queue, said number of data packets depending on the weight assigned to the selected queue, said transmission sessions to which communication resources are allocated being determined as a function of at least the quantities calculated in step (d); and
   (f) repeating steps (d) to (f), as long as the queues have not all been selected and as long as there are still resources available for said transmission time interval, the queue following the queue previously selected in the ranking established in step (b) is selected.

2. Method according to claim 1, in which step (b) comprises a ranking of the queues according to a descending order of the weights respectively assigned to the queues.

3. Method according to claim 1, wherein step (b) comprises a ranking of the queues according to an ascending order of the ratio, calculated for some at least of the queues, of a number of data packets already transmitted from the queue over the weight respectively assigned to the queue.

4. Method according to claim 1, in which step (c) comprises the selection of the first queue in the ranking of the queues performed in step (b) and in which the repetition of step (c), provided for in step (f), comprises the selection of the queue having an immediately higher position than the previously selected queue, according to the ranking of the queues performed in step (b).

5. Method according to claim 1, wherein in step (e), the number of resources allocated to each session within the context of which said transmission session-is required to transmit data packets placed in the selected queue depends on the radio conditions with respect to the radio terminal to which the said radio session relates.

6. Method according to claim 1, wherein, among the set of queues, said one of the queues in which the data packets to be transmitted within the context of each transmission session are placed according to a priority level allocated to the a respective transmission session.

7. Method according to claim 1, wherein the weights respectively assigned to the queues vary between bounds whose respective values fluctuate according to a number of data packets already transmitted, from the corresponding queue.

8. Method according to claim 1, wherein the quantity dependent at least on the radio conditions with respect to the radio terminal to which said transmission session relates and on a number of packets already transmitted within the context of said transmission session, takes account of the quantity calculated for the transmission time interval preceding the new transmission time interval.

9. Method according to claim 1, wherein the quantity dependent at least on the radio conditions with respect to the radio terminal to which said transmission session relates and on a number of packets already transmitted within the context of said transmission session decreases as a function of the quality of the radio link between the base station and said radio terminal, and increases as a function of the number of packets already transmitted within the context of the said transmission session, and in which said transmission sessions to which communication resources are allocated are determined according to an ascending order of said quantity.

10. Method according to claim 1, wherein said transmission sessions to which communication resources are allocated are determined moreover on the basis of a reception capability of the radio terminals to which the said transmission sessions relate, such as a minimum time between two receptions of data packets transmitted over respective transmission time intervals, a number of codes that are applied to data that can be decoded over a transmission time interval, or a type of modulation that is applied to data to be demodulated.

11. Method according to claim 1, wherein said sessions to which communication resources are allocated depend furthermore on whether data packets to be transmitted to radio terminals to which said transmission sessions relate have already been transmitted previously.

12. Method according to claim 1, wherein steps (a) to (f) are executed for each new transmission time interval.

13. Method according to claim 1, wherein the sum of the weights assigned to the queues in step (a) is constant.

14. Base station in a radiocommunication system, comprising means for transmitting, in successive transmission time intervals, data packets destined for radio terminals, on communication resources shared between the radio terminals, within the context of transmission sessions, each transmission session relating to a radio terminal among said radio terminals, in which there is provided a set of queues that are devised so that the data packets to be transmitted within the context of each transmission session are placed dynamically in one of the queues, the base station further comprising:
   (a) assigning means for assigning a respective weight to each queue;
   (b) ranking means for ranking the queues as a function at least of the weights respectively assigned to them;
   (c) first selecting means for selecting a queue as a function of its position in the ranking;
   (d) calculating means for calculating a quantity dependent at least on the radio conditions in respect of the radio terminal to which the said transmission session relates, and on a number of packets already transmitted within the context of the said transmission session, for a new transmission time interval, for each session within the context of which said transmission session is required to transmit data packets placed in the selected queue;

(e) allocating means for allocating communication resources to at least some of the sessions within the context of which said transmission sessions are required to transmit data packets placed in the selected queue, so as to transmit a number of data packets placed in the selected queue, said number of data packets depending on the weight assigned to the selected queue, said transmission sessions to which communication resources are allocated being determined as a function of at least the quantities calculated by the means (d); and (f) second selecting means for, as long as the queues have not all been selected and as long as there are still resources available for the said transmission time interval, selecting the queue following the queue previously selected in the ranking.

15. Base station according to claim 14, wherein the ranking means is arranged for ranking the queues according to a descending order of the weights respectively assigned to the queues.

16. Base station according to claim 14, wherein the ranking means is arranged for ranking the queues according to an ascending order of the ratio, calculated for some at least of the queues, of a number of data packets already transmitted from the queue over the weight respectively assigned to the queue.

17. Base station according to claim 14, wherein the selecting means is arranged for selecting the first queue in the ranking of the queues performed by the ranking means, and in which the second selecting means is arranged for selecting the queue having an immediately higher position than the previously selected queue, according to the ranking of the queues performed by the ranking means.

18. Base station according to claim 14, wherein the number of resources allocated by the allocating means to each transmission session within the context of which said transmission session is required to transmit data packets placed in the selected queue depends on the radio conditions in respect of the radio terminal to which the said radio session relates.

19. Base station according to claim 14, wherein said queues in which the data packets to be transmitted within the context of a transmission session are placed among the set of Queues, depends on a priority level allocated to the session.

20. Base station according to claim 14, wherein the assigning means assigns weights which vary between bounds whose respective values fluctuate according to a number of data packets already transmitted, from the corresponding queue.

21. Base station according to claim 14, wherein the quantity dependent at least on the radio conditions in with respect to the radio terminal to which said transmission session relates and on a number of packets already transmitted within the context of said transmission session, taking account of the quality calculated for the transmission time interval preceding the new transmission time interval.

22. Base station according to claim 14, wherein the quantity dependent at least on the radio conditions with respect to the radio terminal to which said transmission session relates and on a number of packets already transmitted within the context of said session decreases as a function of the quality of the radio link between the base station and said radio terminal, and increases as a function of the number of packets already transmitted within the context of said transmission session, and wherein said transmission sessions to which communication resources are allocated are determined according to an ascending order of the said quantity.

23. Base station according to claim 14, wherein the allocating means allocates communication resources to sessions determined moreover on the basis of a reception capability of the radio terminals to which the said transmission sessions relate, said capacity comprising: a minimum time between two receptions of data packets transmitted over respective transmission time intervals, a number of codes that are applied to the data that can be decoded over a transmission time interval, or a type of modulation that is applied to the data that can be demodulated.

24. Base station according to claim 14, wherein the allocating means allocates communication resources to transmission sessions depending furthermore on the fact that data packets to be transmitted to radio terminals to which said transmission sessions relate have already been transmitted previously.

25. Base station according to claim 14, wherein the sum of the weights assigned to the queues by the assigning means is constant.

* * * * *